No. 864,244. PATENTED AUG. 27, 1907.
B. E. HUGULEY.
CULTIVATOR AND HARROW.
APPLICATION FILED JUNE 5, 1907.
2 SHEETS—SHEET 2.
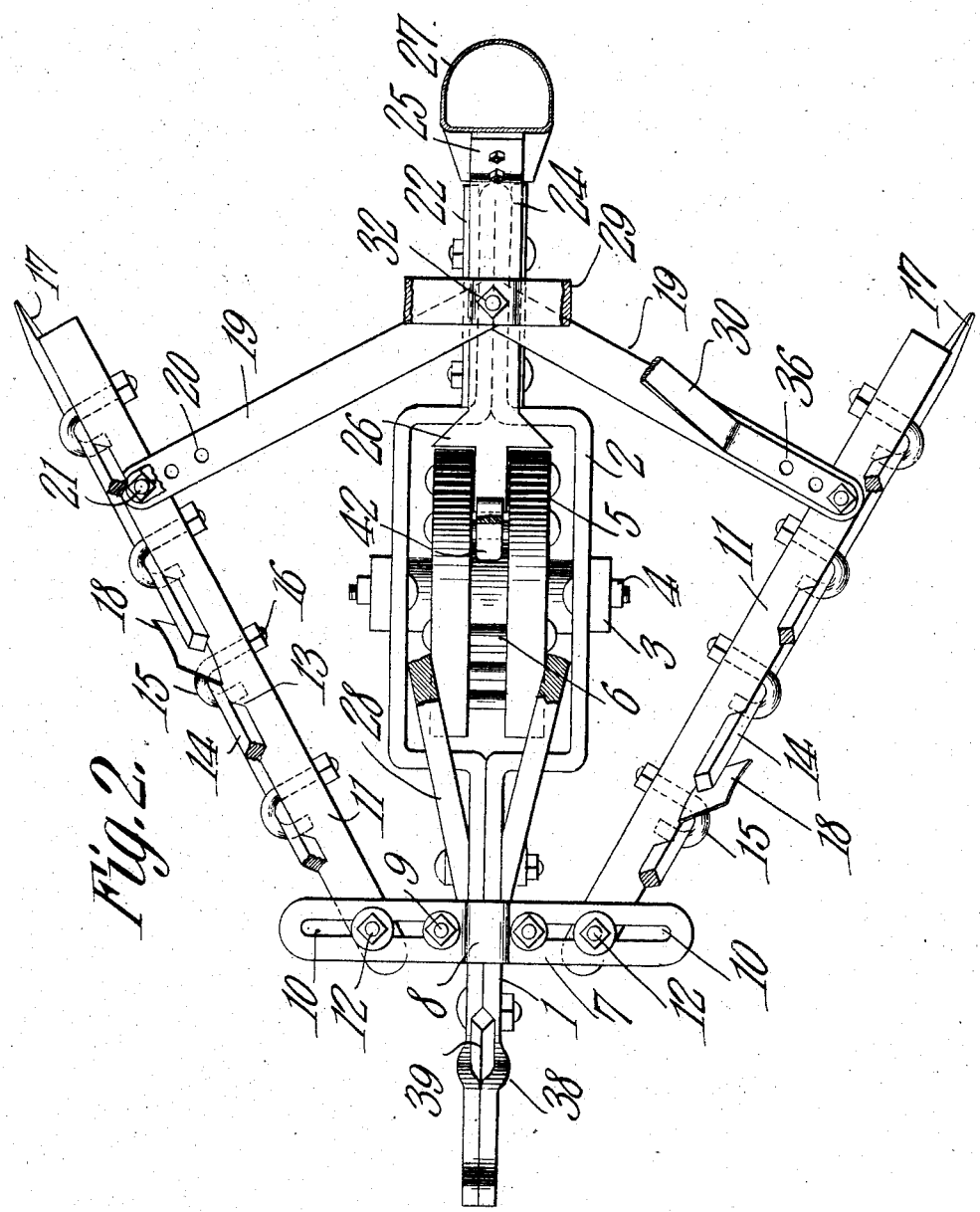
WITNESSES: Burwell E. Huguley, INVENTOR.
By C. A. Snow & Co.
ATTORNEYS

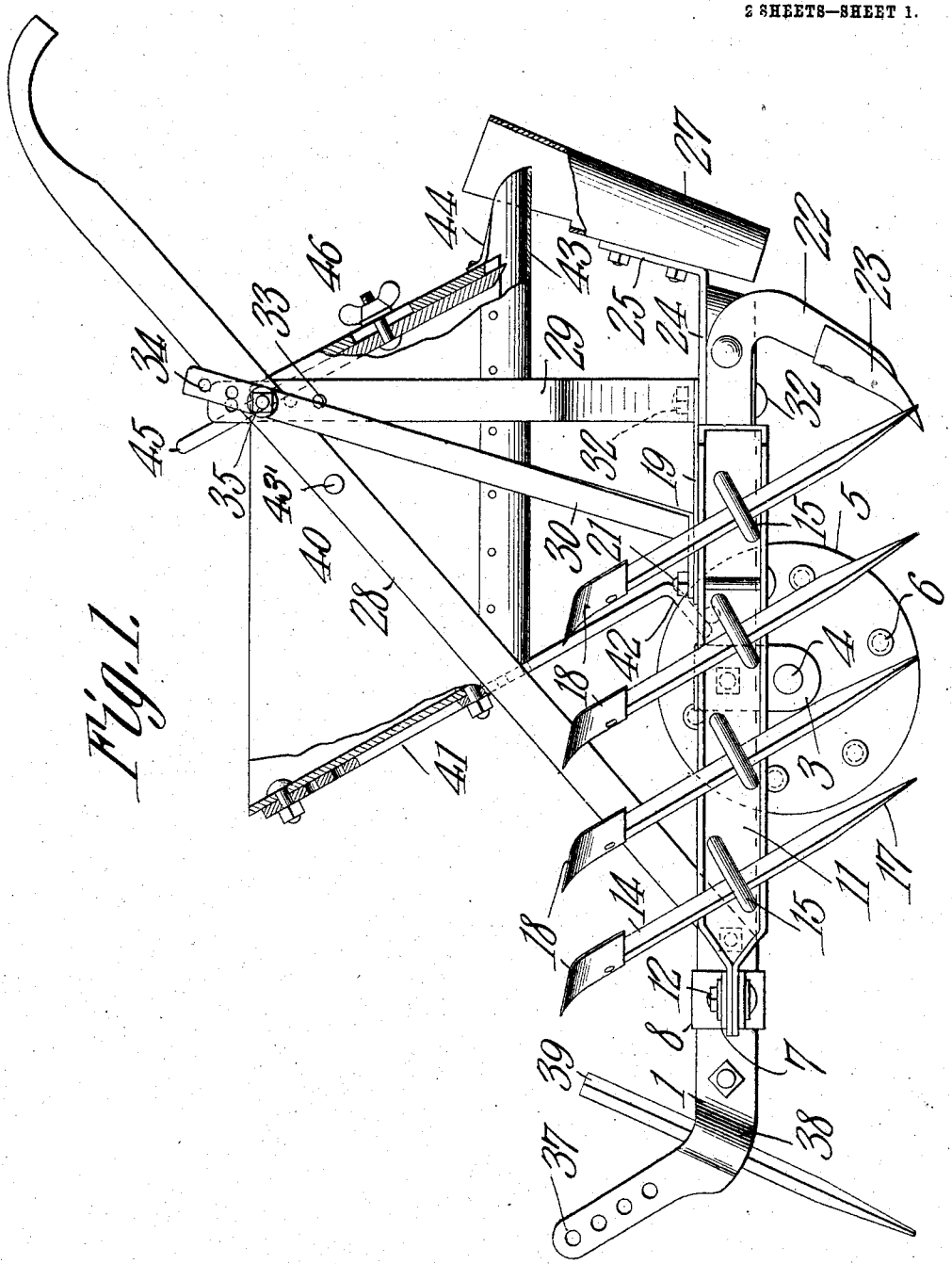

UNITED STATES PATENT OFFICE.

BURWELL EDWIN HUGULEY, OF DANBURY, GEORGIA.

CULTIVATOR AND HARROW.

No. 864,244.  Specification of Letters Patent.  Patented Aug. 27, 1907.

Application filed June 5, 1907. Serial No. 377,397.

*To all whom it may concern:*

Be it known that I, BURWELL EDWIN HUGULEY, a citizen of the United States, residing at Danbury, in the county of Wilkes and State of Georgia, have invented a new and useful Cultivator and Harrow, of which the following is a specification.

This invention has relation to cultivators and harrows which may also be used for fertilizer droppers and it consists in the novel construction and arrangement of its parts as hereinafter shown and described.

The object of the invention is to provide an implement of the character indicated the parts of which may be easily and readily adjusted and interchanged in order to arrange the harrow teeth in desired lines with relation to the line of draft and the cultivator shovels in desired positions with relation to the row of plants.

In the accompanying drawing:—Figure 1 is a side elevation of the cultivator and harrow with parts in section, and Fig. 2 is a top plan view of the same with parts removed.

The implement consists of the middle beams 1 which are bolted together and each of which is provided with a lateral bend 2 located at an intermediate point. The lugs 3 depend from the middle portions of the bends 2 and the shaft 4 is carried by the said lugs 3. The disks or wheels 5 are journaled upon the shaft 4 and are spaced apart and held in proper relation to each other by means of the cross pins 6 which are arranged at equal distances from the centers of the said disks. The cross bars 7 are provided at their middles with the bends 8 which receive the beams 1 and which are held together by the bolts 9 located upon the opposite sides of the said beams and which serve as clamps. The said bars 7 are provided at their end portions with the elongated slots
10. The side bars 11 are preferably formed from channel iron and have their forward ends reduced vertically and located between the cross bars 7. The bolts 12 pass through the forward ends of the side bars 11 and the slots 10 and constitute means for adjustably securing the said side bars to the cross bars. The flanges of the side bars 11 are notched as at 13 and the earth engaging elements 14 rest in the said notches and are held therein by means of the hooks 15 each of which passes through a perforation in the middle portion of one of the bars 11 and is provided at its inner end with a nut 16. The earth engaging elements 14 are pointed at one end, as at 17, which end constitutes a harrow tooth while the opposite end is provided with a cultivator shovel 18. The braces 19 are pivoted at their inner ends to the beams 1 behind the bent portions 2 thereof and are provided at their outer ends with the perforations 20 through which the bolt 21 may be passed in order to adjustably hold the rear portions of the side bars 11 with relation to the beams 1. The standard 22 is attached to the rear ends of the beams 1 and is provided with a shovel 23.

A strip 24 is attached to the upper edges of the rear portions of the beams 1 and is provided at its rear end with an upstanding portion 25 while its forward end extends in between the disks 5 and is provided with the laterally disposed shoulders which terminate in close proximity to the peripheries of the said disks and form scrapers and trash fenders 26 for the same. The chute 27 is attached to the end portion 25 of the plate 24. The handles 28 are attached at their forward ends to the beams 1 in advance of the bent portions 2 thereof. The intermediate portions of the handles 28 are supported by the braces 29 and 30. The brace 29 is attached to the beams 1 by means of a bolt 32 which also serves as the securing means for the braces 19 and strip 24. The upper ends of the brace 29 bear against the inner sides of the handles 28 and are provided with a series of perforations 33. The upper ends of the braces 30 bear against the outer sides of the handles 28 and are provided with a series of perforations 34. The bolt 35 passes through the handle 28 and also through perforations in the adjacent braces 29 and 30. Thus it is possible to pitch the handles at a desired angle with relation to the beams 1. The lower ends of the braces 30 are provided with series of perforations 36 through any one of which the bolt 21 may be passed. The forward ends of the beams 1 are upwardly curved and provided with a series of clevis perforations 37. The forward portions of the beams 1 are bowed laterally as 38, which bows are adapted to receive between them the tooth or opener 39.

The hopper 40 is rhombic in side elevation and is provided at its forward end with a depending arm 41 adjustably attached thereto. The lower end of said arm passes between the disks 5 and is forwardly curved as at 42 and lies in the path of the pins 6. The rod 43' passes transversely through the hopper 40 and the handles 28 and supports the hopper. The said hopper is pivotally mounted upon the said rod and the rod is located in alinement with the greater angles of the side of the figure but out of alinement with the small angles thereof. The hopper 40 is provided with a concaved bottom 43 which projects beyond the rear end of the hopper and terminates in a spout 44 which enters the upper portion of the chute 27. The space between the rear side of the hopper 40 and the bottom 43 thereof forms an outlet through which material may pass from the hopper into the chute 27. The valve 45 is adjustably attached to the rear side of the hopper 40 and is held in proper adjusted position by means of the bolt and wing nut 46. The said valve 45 may be moved so as to increase or diminish the transverse area of the outlet of the hopper.

From the foregoing description it is obvious that an implement of the character described is provided, the parts of which may be adjusted into various positions to meet conditions and that the side bars 11 may be shifted from one side to the other of the implement and turned so as to operate the implement as a harrow or a cultivator and if used as a cultivator the disks 5 may be removed also the standard 22 and the plates 18 may be so disposed as to throw the earth toward the row of plants or away from the same as the cultivator is operated as a straddle row. Also by adjusting the handles 28 between the braces 29 and 30 the hopper 40 may be raised or lowered so that it may have a desired pitch for depositing different kinds of fertilizer. It is also obvious that as the disks 5 rotate the pins 6 will successively come in contact with the lower end of the arm 41 and through the same swing the said hopper 40 upon its pivot and cause the fertilizing material to flow from the hopper through the chute 27 to the ground in the rear of the plow 23.

Having described my invention what I claim as new and desire to secure by Letters-Patent is:—

1. An implement as described comprising beams, members secured together and having at intermediate points laterally disposed bends, spaced disks journaled for rotation between said bends, cross pins connecting said disks together, cross bars attached to the beams, side bars adjustably attached to the cross bars and carrying ground engaging elements, braces attached at their inner ends to the rear portions of the beams, means for adjustably attaching the outer ends of the said braces to the side bars, handles attached to the beams, a hopper pivoted between the handles, an arm depending from said hopper and having its end located in the path of said pins, a spout attached to the hopper and a chute supported upon the beams and receiving said spout.

2. An implement as described comprising beams attached together and having at intermediate points laterally disposed bends, wheels journaled for rotation between said bends, pins connecting said wheels together, a cross bar attached to the beams, side bars adjustably attached to the cross bar and carrying ground engaging elements, handles attached to the beams, a hopper pivotally supported between the handles, an arm depending from said hopper and projecting into the path of said pins, a plate attached to the rear portions of the beams and having its forward end lying between the wheels and being provided with shoulders in proximity with the peripheries thereof, a chute attached to the rear end of said plate and a spout attached to the hopper and entering said chute.

3. An implement as described comprising beams secured together and having lateral bends at intermediate points, cross bars attached to the beams, side bars adjustably attached to the cross bars and carrying ground engaging elements, wheels journaled for rotation between the lateral bends of the beams, cross pins connecting said wheels together, handles pivoted at their forward ends to the beams, means for swinging the handles and securing them in an adjusted position, a hopper pivotally mounted between the handles, an arm depending from said hopper and projecting into the path of the cross pins, a spout carried by the hopper and a chute supported upon the beams and receiving said spout.

In testimony that I claim the foregoing as my own, I have hereto affixed my signature in the presence of two witnesses.

BURWELL EDWIN HUGULEY.

Witnesses:
 JOHN D. BUNCH,
 TOM H. ANDERSON.